W. R. WALKER.
BROACHING DIE.
APPLICATION FILED MAR. 14, 1911.
1,070,561.
Patented Aug. 19, 1913.
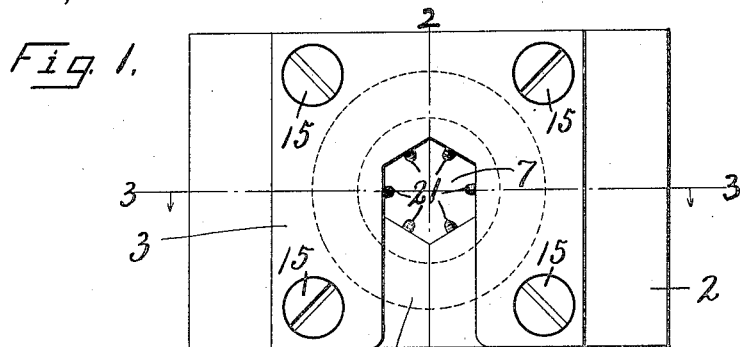
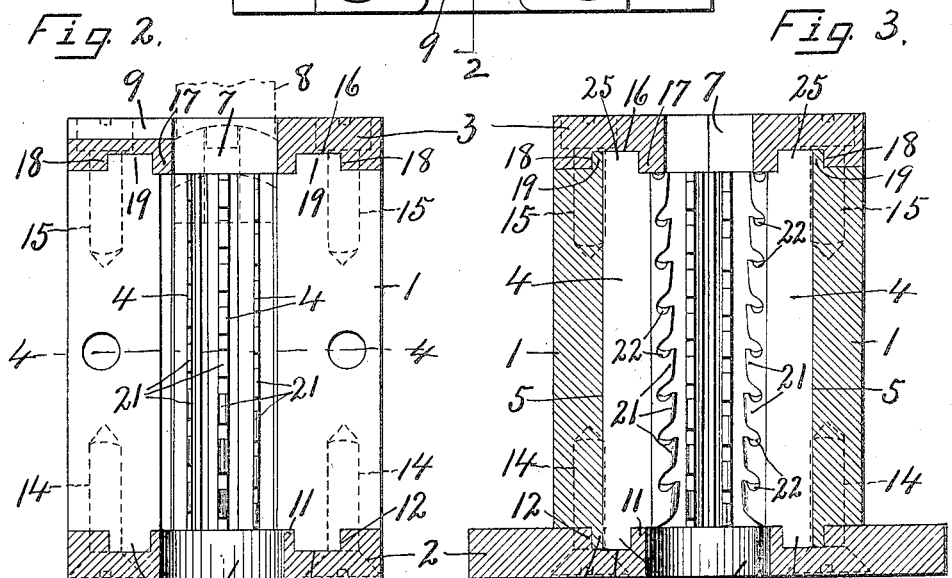
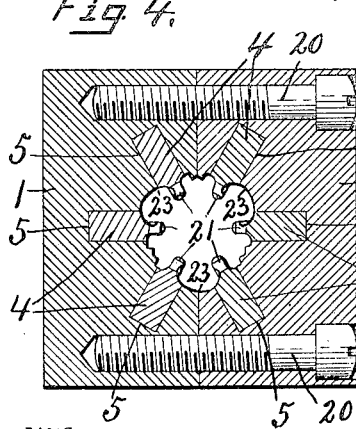
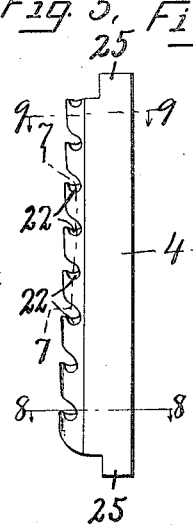

UNITED STATES PATENT OFFICE.

WILLARD R. WALKER, OF SYRACUSE, NEW YORK.

BROACHING-DIE.

1,070,561.  Specification of Letters Patent.  Patented Aug. 19, 1913.

Application filed March 14, 1911. Serial No. 614,421.

*To all whom it may concern:*

Be it known that I, WILLARD R. WALKER, of Syracuse, in the county of Onondaga, in the State of New York, have invented new and useful Improvements in Broaching-Dies, of which the following, taken in connection with the accompanying drawings, is a full, clear, and exact description.

This invention relates to certain improvements in channeling dies for grooving nuts and similar articles which may be forced through the dies under pressure of a suitable plunger, the specific object being to form lengthwise grooves in the sides of lock nuts for receiving suitable locking keys or pins somewhat similar to that set forth in my Patent #761,274, issued May 31, 1904, in which the key is passed through an aperture in the bolt and its ends bent over into the grooves in the nut to lock the nut and bolt against relative turning.

The main object is to cut a plurality of four or more grooves in the sides of a nut in pairs diametrically opposite to each other in a single operation, the number of grooves depending upon the number of sides of the nut.

In my pending application #376,186 filed May 28, 1907, is shown a die having stepped groove cutters for cutting the grooves gradually deeper as the nut is forced through the die but in that case the cutters are formed upon disks which are seated one upon the other in the die supporting block. These disks are, however, not only difficult and expensive to make but it is found to be practically impossible to obtain a uniform hardening of the cutters, some of which will be too brittle and others too soft, and furthermore in these disk dies or cutters all of the cutting edges of the cutters are disposed in substantially the same plane at right angles to the axis of the die so that the cutters of each disk are cutting at the same time, thereby requiring a considerable power to force the nut through the die and also producing excessive strain upon such die. Another serious objection to the use of these disk dies is that the sudden passage of the nut under pressure from one disk to the next succeeding disk is more or less liable to break the cutters. A still further objection to the use of disk cutters is that the cutters of each disk must be milled separately by reason of the fact that they are of different radial depth than those of the other disks.

The object of my present invention is to overcome these objections; first, by making all of the stepped cutters for grooving one side of the nut upon a single bar which may be easily tempered to the desired hardness; second, by permitting a large number of these bars to be placed together side by side and their cutters milled in the edges thereof simultaneously; and third, by permitting the cutter bars to be arranged in the die block in such manner that the corresponding cutting edges of each diametrically opposite pair of bars may be disposed in substantially the same transverse plane but in a different plane from the corresponding cutting edges of the other diametrically opposite pairs so that the corresponding cutting edges of one pair are in a different plane from those of the next adjacent pair, whereby the cutting of the grooves is more gradual and with less resistance than would be the case if the corresponding cutting edges were in the same plane.

Another object is to make the die block of side and end sections so that the sides may be quickly and economically grooved for the reception of cutter bars, and to construct the end sections in such manner that they serve to lock the side sections together and also to retain the cutter bars firmly in operative position, thereby permitting either one or all of the cutter bars to be removed or withdrawn endwise by simply removing one of the end heads or sections.

Other objects and uses will be brought out in the following description:

In the drawings—Figure 1 is a top plan of my improved die. Figs. 2 and 3 are transverse vertical sectional views taken respectively on lines 2—2 and 3—3 Fig. 1. Fig. 4 is a horizontal sectional view taken on line 4—4, Fig. 3 except that both side sections of the die block are shown. Figs. 5 and 6 are respectively a side elevation and an edge view of one of the cutter bars. Fig. 7 is a lengthwise sectional view through the cutting teeth of a portion of one of the bars taken on line 7—7, Fig. 5. Figs. 8 and 9 are transverse sectional views taken respectively on lines 8—8 and 9—9 Fig. 5. Fig. 10 is a top plan of a groove nut after being cut by my improved die.

This die preferably consists of a substantially rectangular sectional block of cast metal, machine steel or other suitable material composed of opposite similar side sections, —1— opposite end sections —2— and —3— and a series of, in this instance six, similar cutter bars —4— for grooving hexagonal nuts as —a— Fig. 10 although it is evident that any other number of cutter bars may be used according to the number of sides of the nut which is to be grooved.

The side sections —1— when assembled form a hollow rectangular block, substantially square in cross section as shown in Fig. —4—, each section being of substantially the same form and size and provided with a series of, in this instance three, substantially radial, lengthwise grooves —5— extending from end to end of the sections —1— and spaced a uniform distance apart around a common axis to form suitable seats for the cutter bars —4—.

The end sections —2— and —3— are provided with substantially central openings —6— and —7— coaxial with each other and with the opening between the sections —1—, the opening —6— being preferably circular and somewhat larger than the opening —7—, which latter is preferably hexangular or of substantially the same form and size as the nut which is to be grooved and through which said nut is adapted to be forced under pressure of a plunger —8— shown by dotted lines in Fig. —2—.

The upper side of the head —3— is provided with a radial guide groove or recess —9— extending from the opening —7— to one side of the head into and along which the nut may be inserted and moved inwardly to register with the opening —7— preparatory to cutting the grooves therein in a manner hereinafter described.

The base or head —2— is provided with an annular groove —10— concentric with the opening —6— for forming inner and outer shoulders or flanges —11— and —12— for receiving reduced projections or flanges —13— on the adjacent end of the sections —1— and thereby locking said sections against relative radial movement, said head being additionally secured to the sections —1— by screws —14— shown by dotted lines in Figs. —2— and —3—. In like manner the opposite head —3— is secured to the adjacent end of the sections —1— by screws —15— also shown by dotted lines in Figs. —2— and —3—, said head being provided with an annular groove —16— concentric with the axis of the opening —7— and forming inner and outer flanges or shoulders —17— and —18— for receiving the reduced adjacent ends —19— of the sections —1— and thereby locking the upper ends of said sections against relative radial movement in a manner similar to that described for the base sections —2—.

The object in making the main body of the block in sections is to permit the grooves —4— to be more easily and accurately milled or formed from the inside which operation may be performed by simply running the milling or planing tool lengthwise of the sections —1— from end to end and in order that the intermediate portions may be prevented from springing under the high pressure required to force the nut through the die in the operation of cutting the groove, said intermediate portions are secured together by bolts or machine screws —20— as best seen in Fig. —4—.

The cutter bars —4— are preferably made of stock steel suitably hardened to resist the strains to which they are subjected and are all of substantially the same size and of such thickness as to fit snugly in their respective grooves so that they may be readily interchanged thereby permitting any one of the bars to be inserted in any one of the grooves.

The outer edges of the bars and bases of the grooves against which they are seated are substantially straight so as to facilitate the insertion and withdrawal of the bars in and from the sections —1— and at the same time rigidly sustaining said bars at all points to prevent them from springing laterally under pressure to which they are subjected in forcing the nut through the die.

The inner edges of the main body of the cutter bars project inwardly some distance beyond the grooves in which they are seated or rather into the opening between the sections —1— and are preferably reduced in thickness and provided with a series of teeth —21— of gradually increasing radial depth from the head end —3— toward the opposite end section —2— so that each succeeding tooth projects inwardly slightly beyond the vertical plane of the next one to it to cause the grooves to be cut in the nut gradually as said nut is forced through the die, thereby taking off a comparatively light chip or shaving.

It will be observed upon reference to Figs. —3— and —5— that the inner edge of each tooth is beveled or gradually recedes outwardly from the point toward the base and that one and the same side faces of the cutting edges of the teeth are also beveled or recessed at —22— for the purpose of deflecting the chip or shavings from the point of the tooth laterally into suitable grooves or lengthwise recesses —23— on the inner sides of the sections —1—. Each of these grooves —23— therefore serves to receive the chip or shavings from two adjacent cutter bars, said grooves communicating with the opening —6— to allow the chips or shavings to gravitate downwardly and outwardly away from the cutters and through said opening away from the die, thereby avoiding any possibility of the die becoming clogged with such chips or shavings.

By arranging the cutter bars in the man-

3. A broaching die comprising a hollow block having a plurality of sets of longitudinally stepped teeth and lengthwise clearing grooves for the chips between the several sets of teeth.

4. A broaching die comprising a hollow block having a plurality of sets of longitudinally stepped teeth and lengthwise clearing grooves for the chips between the several sets of teeth, said teeth having lengthwise channels in one side communicating with the lengthwise grooves for deflecting the chips from the base of the teeth into said channels.

5. A broaching die comprising a hollow block having a set of grooves for receiving cutter bars and another set of grooves for receiving chips, cutter bars seated in their grooves and having stepped teeth, said teeth having clearance channels in their sides facing the grooves for the chips.

6. A broaching die having a lengthwise opening therethrough from end to end and a series of lengthwise channels communicating with said opening, said die being also provided with a plurality of sets of longitudinally stepped teeth projecting into the opening between said channels.

7. A broaching die comprising a main supporting body having a lengthwise opening therethrough from end to end and a plurality of sets of teeth projecting radially from the main body into said opening, the teeth of each set being stepped longitudinally from one end toward the opposite end and provided with chip-clearance channels in their sides and communicating with said opening.

In witness whereof I have hereunto set my hand on this 14th day of December, 1910.

WILLARD R. WALKER.

Witnesses:
H. E. CHASE,
E. F. SPEARING.

ner shown in Fig. —4— so that the beveled edges or recesses —22— face a single groove or clearance channel —23—, it is only necessary to form half as many of these grooves or channels as there are cutter bars and aside from this economy of manufacture of the dies, the beveled edges or recesses —22— together with the grooves —23— constitute an important feature of my invention in that the beveled edges —22— operate to automatically deflect the chips or shavings away from the cutting edges of the teeth and into the channels —23— which are of sufficient size to allow said chips to readily gravitate from between the bars downwardly through the opening —6— and clear of the die. The cutter bars —4— are also provided with reduced ends —25— which extend into the recesses —10— and —16— respectively in the lower and upper heads —2— and —3— and fit snugly between the bases of the grooves —5— and inner flanges —11— and —17—. The length of these reduced portions —25— of the bars —4— is substantially equal to the depths of the grooves in which they are seated, while the opposite ends of the intermediate portions of the edges of said cutter bars rest against the inner faces of the flanges —11— and —17— thereby preventing any possibility of endwise movement of said bars when the heads are clamped in place upon the sections —1—.

Another important feature of this invention consists in arranging the teeth of each bar so that the cutting edges of the corresponding teeth of adjacent bars are in slightly different horizontal planes whereby the preceding tooth of one bar will have at least partially cut the groove in one side of the nut before the corresponding tooth of the next adjacent bar begins to cut and so on down through the series of teeth of the several bars but the cutting edges of corresponding teeth of diametrically opposite bars are preferably disposed in the same horizontal plane so as to operate on diametrically opposite sides of the nut at the same time, thereby more effectively supporting and guiding the nut in a horizontal plane as it is forced through the die. By this arrangement of the teeth the cutting of the grooves is more gradual and produces less strain upon the die and also requires less power to force the nut through the die with less liability to pass suddenly from one set to the next succeeding set of teeth.

In assembling the parts of the broaching die or sections —1— may first be clamped together by the bolts —20— after which the base sections —2— may be secured in place by the bolts —14— and the cutter bars —4— are then placed in their respective grooves and the upper head —3— secured in place by the screws —15—, the die being then ready for use. The nut to be broached or grooved is then placed in the groove —9— and moved inwardly into registration with the central opening in the die so as to rest upon the uppermost teeth of a pair of diametrically opposite bars. The plunger —8— is then forced downwardly to press the nut through the die to form the grooves therein. As the nut is forced from the top downwardly through the die, the groove is gradually deepened as it encounters the successive teeth which are stepped inwardly from the top downward. During this operation the chips or shavings which are cut from the blank are deflected laterally through the channels —22— in one side of the cutting edges of the teeth and thence into the grooves —23— through which the chips and shavings gravitate through the opening —6— clear from the die, the grooved nuts being also ejected from said opening.

The die is preferably made of sufficient length to receive a number of nuts at a time and in order that the grooving operation may be economical, the first nut inserted through the inlet —7— is forced downwardly by the plunger a distance substantially equal to the thickness of the nut, whereupon the plunger is elevated and another nut is inserted and similarly operated upon by the plunger, this operation being repeated as each nut is forced downwardly a distance equal to its thickness so that as the operation progresses the die is substantially filled with nuts and therefore a plurality of them are being cut at the same time.

In case any one of the cutter bars should become impaired by the breaking of one or more of its teeth, it may be readily withdrawn and replaced by a new one without disturbing the other cutter bars by simply removing the one or the other of the end heads as, for example, the upper head —3— and afterward replacing it with the assurance that all of the bars will be firmly held in fixed relation to the die block when adjusted for use.

What I claim is:

1. A broaching die having a lengthwise opening therethrough and provided with a plurality of lengthwise sets of teeth facing the lengthwise center of the opening, those of each set being stepped longitudinally toward said axis and provided with clearance channels in their sides communicating with said opening in the die.

2. A hollow broaching die having a plurality of sets of longitudinally stepped teeth projecting inwardly toward the longitudinal center of the die and provided with lengthwise clearance channels communicating with the interior of the die for deflecting the chips to one side of the teeth.